April 22, 1924.                                                    1,490,955
H. F. BELL ET AL
HIGH SPECIFIC SPEED WATER TURBINE
Filed April 19, 1922
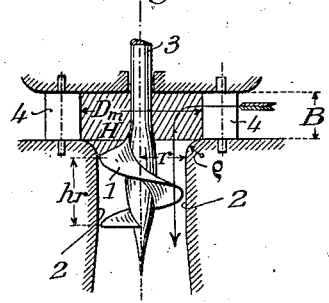
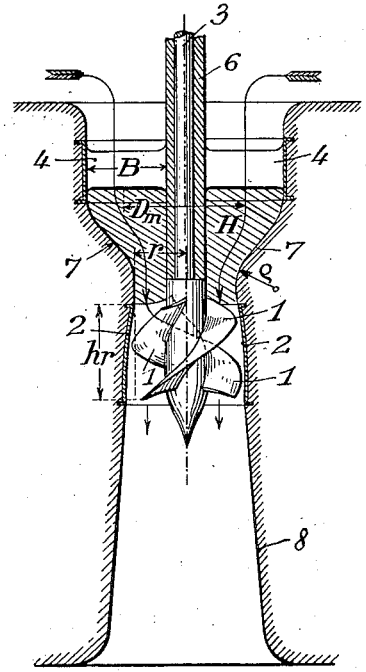
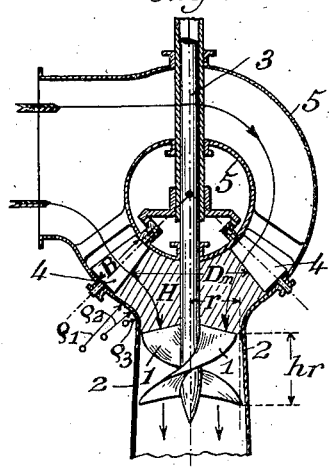
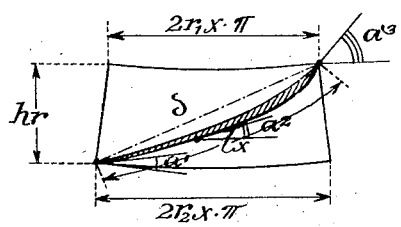
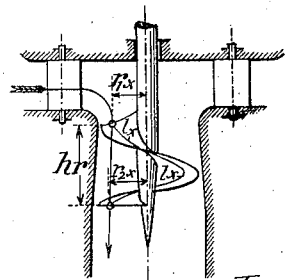
Inventors:
Hermann F. Bell,
Johann Schnyder,
By
    Atty.

Patented Apr. 22, 1924.

1,490,955

UNITED STATES PATENT OFFICE.

HERMANN F. BELL AND JOHANN SCHNYDER, OF KRIENS, NEAR LUCERNE, SWITZERLAND, ASSIGNORS TO AKTIENGESELLSCHAFT DER MASCHINENFABRIK VON THEODOR BELL & CIE., OF KRIENS, NEAR LUCERNE, SWITZERLAND.

HIGH-SPECIFIC-SPEED WATER TURBINE.

Application filed April 19, 1922. Serial No. 555,604.

*To all whom it may concern:*

Be it known that we, HERMANN F. BELL, a citizen of the Republic of Switzerland, residing at Kriens, near Lucerne, Switzerland, and JOHANN SCHNYDER, a citizen of the Republic of Switzerland, residing at Kriens, near Lucerne, Switzerland, have invented certain new and useful Improvements in High-Specific-Speed Water Turbines; and we hereby declare the following to be a clear, full, and exact description of the invention, such as will enable others skilled in the art to which it appertains to make and use the same, reference being had to the accompanying drawings, and to letters or figures of reference marked thereon, which form a part of this specification.

Economical conditions and the tendency to run electrical machinery at high speeds demand the harnessing of water powers so that turbines that run at high speeds and utilize the available water power in an efficient way are in demand.

To meet this demand with water powers having a small available head turbines running with high specific speeds have to be used. The hitherto known types of the high specific speed turbines present the following disadvantages: they do not run at sufficiently high speeds and do not give satisfactory efficiencies, further upon a comparatively small reduction of the area of the passage ways for the water within the turbine, when the latter is for instance adjusted to suit altered load conditions, the efficiency begins to decrease and drops comparatively rapidly upon a large reduction of that passage area.

The characterizing features of the heretofore known type of high-speed turbines consist in that the rotor wheels are provided with blades the length of which measured in the direction of the flow of water is small in comparison with the main circumference of the wheel or with the wheel diameter. Further it has been generally acknowledged that a comparatively large clearance between guide-wheel and rotor-wheel of the turbine is necessary for attaining a good efficiency. The various turbine theories according to which the calculation of turbines can be made and which are based on the 1, 2 or 3 dimensional conditions of flow do not allow of a precise calculation of the shape of the stream lines for the normal conditions of head, quantity and speed for which the turbine has to be designed; the conditions presenting themselves when the turbine is only partially loaded frustrate any calculation that might claim to be accurate. In consequence thereof it is difficult to determine the angles of entrance so that at least under the normal running conditions of the turbine the water enters the rotor wheel without shocks, and with the turbine running at partial loads, i. e. with the guide apparatus only partially opened the magnitude of the angular deviations of the flow of the water current from the relative entrance, or from the angle of entrance of the blades at normal conditions, cannot even approximately be arrived at. In consequence thereof the known high-speed wheels work with considerable losses due to shocks at the entrance into the rotor wheel which explain the losses in the output. Moreover the eddies generated by said shocks are transmitted by the current along the comparatively short blades so that they are still present when the water leaves the rotor wheel and these eddies are even transmitted, increased by the shocks occurring at the discharge end of the rotor wheel, to the suction tube, whereby they influence in a detrimental way the recovering of energy in the suction tube which is of particular importance with high specific speed turbines.

The transmission of the above mentioned whirlings and eddies along the whole blade of the runner causes corrosions of the blades whereby the surface of the blades is roughened, the hydraulic frictional resistance is increased whereby a reduction of the efficiency of the turbine and a gradual destruction of the latter is caused.

The short blades of the hitherto known types effect a comparatively bad guidance of the water, particularly when eddying and contraction occur due to the shocks at the entrance side of the rotor wheel, so that the relative direction in which the water leaves the runner cannot be fixed with sufficient accuracy. Owing to the fact that with high specific speed turbines a considerable portion of the total energy is still contained in the water leaving the rotor wheel the uncertainty in fixing the direction and the magnitude of the relative and absolute speeds with which the water leaves the rotor wheel results in discharge losses that are far too great so that the efficiency of the hitherto known turbines of this type is bound to be low.

It is further known that when a closed jet of water impacts against a surface that is arranged at an angle to the direction of flow of the water jet, the water particles which flow in touch with this deflecting surface and the adjacent water particles are subjected to considerable impact losses, eddies and contractions, whereas the stream lines or threads at some distance from the deflecting surface are deflected practically without energy losses. This deflection is the more gradual and the more free of losses the greater the distance of a stream thread is from the deflecting surface. Thereby the fact results that a stream of water divided into two water jets and deflected by two deflecting surfaces that are alike are together subjected to an essentially higher impact loss than if these two water jets were united to one jet of double the thickness and were deflected by only one deflecting surface.

The above mentioned disadvantages are overcome by the water turbine forming the object of the present invention.

According to the invention the water turbine adapted to run with high specific speeds is characterized by a rotor wheel having no outer rim and through which the water flows in a substantially axial direction, the wheel being provided with at the utmost three blades shaped according to a screw or helicoidal surface having a varying axial pitch, the length of the blades being so chosen, that for any point of the blade the length of the line of intersection of the blade with a stream line surface passing through this point is greater than the circumferential pitch in this stream line surface at the discharge end of the rotor wheel.

The adoption of the lowest possible number of blades, i. e. 1, 2 or 3, causes the losses due to shocks at the entrance side to be reduced as much as possible, particularly when the turbine is working at partial loads. The losses due to shocks occurring at the discharge end of the runner and resulting from the thickness of the blades are also reduced approximately in direct proportion to the reduced number of blades. Furthermore it has to be borne in mind that the roughness of the surface of each blade causes a retardation in the flow of water in the immediate neighbourhood of the blades and has an eddying effect. This eddying which is mainly dependent on the condition of the surface of the blades and on the speed of the flow decreases also in proportion to the reduction of the number of blades.

Although the losses caused by the frictional resistances offered by the surface of the blades increase in direct proportion to the length of the blades, substantially longer blades are used with the rotor wheel of the turbine forming the subject of the present invention than with the hitherto known rotor wheels of turbines running at the same specific speeds. By means of such long blades a reliable guidance of the water during its flow through the rotor wheel is effected and disturbances and eddies owing to an entrance into the rotor wheel of the water that is not free of shocks are damped during the long guidance way. Thereby a more uniform discharge from the rotor wheel is attained and the relative and absolute direction of the discharge flow can comparatively easily be arrived at by calculation or in a graphical manner. Besides attaining the above mentioned advantages it is rendered possible to give the comparatively long blades an easy curvature which fact is of great importance with the extremely high relative speeds present in high specific speed rotor wheels in order to effectively reduce losses originating from impacts, contractions and eddying.

The stipulated condition for the length of the blades is that in any point of the blade the length of the line of intersection of the blade with a stream line surface passing through this point is at least equal to the circumferential blade pitch in the discharge end of the rotor wheel and in this stream line surface.

The rotor wheel provided with at the utmost three long and gently curved blades shaped to form a helicoidal surface is designed without an outer rim owing to its high mechanical strength.

The application of a true helicoidal shape for the rotor wheel blades would not be advantageous to a gradual transmission of energy from the water to the rotor wheel and the blades are therefore designed as helicoidal surfaces having a variable axial pitch. It is favourable to use a pitch that decreases by degrees in the direction of the relative flow of the water, i. e. the entrance angle of the blades being greater than the discharge angle of the blades. The increase of the entrance angle peresents the advantage that a decrease of the high relative speed at the entrance end of the rotor wheel and an increase of the speed of the meridional flow of the water through the rotor wheel is attained, whereby the diameter at the entrance end of the rotor wheel is reduced and a higher specific speed attained.

Preferably the blades are so shaped that the axial pitch is the same or approximately the same in all the distances from the axis. Depending on the ratio between the entrance angle and the discharge angle the chamber enveloping the rotor wheel may be of cylindrical shape, or of a conical shape or it may be any chamber generated by the rotation of a meridian curve the main direction of which does not deviate much from the direction of the axis of the rotor wheel (Figs. 1, 2 and 3). Preferably the cross-sectional area of this chamber increases towards the discharge end of the rotor-wheel.

As the hereinbefore described high specific speed rotor wheel works with high relative velocities it is advantageous to provide for very ample discharge areas in the guide apparatus cooperating with the rotor wheel in order to minimize friction losses. It has been found by experiments that the exit area of the guide apparatus represented by the cylinder obtained by a rotation around the axis of the rotor wheel of the inner edge of the guide vanes when the latter are in the full open position has to be substantially equal or greater than $3r^2 \pi$, "$r$" denoting the radius of the smallest cross-sectional area of the chamber enveloping the rotor wheel (Figs. 1, 2 and 3).

Exhaustive experiments have further shown that the average diameter "$D_m$" at the discharge end of the guide wheel cannot be increased at will, such increases would also be contradictory to practical requirements, and that the conditions are the most favourable if the width or the height "B" of the guide apparatus is equal to or greater than "$r$."

Between the rotor wheel and the guide apparatus designed as above described a large free space is interposed in which the eddies and impacts occurring when the water flows through the guide apparatus can be subdued before the water stream reaches the rotor wheel. The efficiency and the life of the turbine being greatly increased when the entrance of the eddying current into the rotor wheel is thus prevented. Furthermore this large space causes the water to adjust its flow according to the laws of liquid flow that is free from eddies and whirls and to form a rotating water ring in front of the rotor wheel, thus reducing the entrance losses. Furthermore to this free space such a shape may be given that an acceleration of the water that is free of losses is caused between the outlet of the guide apparatus and the entrance of the rotor wheel.

It is thereby essential that the rotation component of the water leaving the guide apparatus is chosen to suit the constructional features of the free space and of the rotor wheel.

The radius of curvature "$r$" of the curved meridian line by the rotation of which the free space is confined is preferably so chosen with regard to its length that a continuously increasing acceleration of the water is effected (Figs. 1, 2, 3).

Constructional examples of the turbine according to the invention are diagrammatically illustrated on the accompanying drawings, in which:

Fig. 1 is a vertical section through a first constructional example,

Fig. 2 is a vertical section through a second constructional example,

Fig. 3 is a vertical section through a third constructional example,

Fig. 4 is a diagrammatical section through a turbine showing the determination of the length of a blade, Fig. 5 is the developed line of intersection of the stream line surface with the helicoidal blade shown in Fig. 4.

Referring to the constructional example illustrated in Fig. 1, 1 denotes the rotor wheel which is provided with one helicoidal blade. The chamber which envelops the runner is of a cylindrical shape to which any suitably shaped suction tube, for instance a conical tube as shown in Fig. 3, joins. The shaft of the turbine is arranged vertically.

The guide apparatus is provided with movable guide vanes 4 and the water flows through the guide apparatus in a substantially radial direction. The water moving in the direction of the arrow is quiet, i. e., free from eddies in the space H indicated by hatching, further its direction of flow is changed and it is accelerated. The intermediate part between the guide apparatus and the enveloping chamber 2, 2 enveloping the runner is formed in the meridional section by a quarter of a circle having the radius $\mathring{r}$. The clear width or height B of the guide apparatus is equal to the smallest radius $r$ of the chamber 2, 2.

Fig. 2 illustrates an enclosed turbine with a guide apparatus through which the water flows diagonally with regard to the direction of the axis of the rotor wheel the guide apparatus being provided with movable guide vanes 4. The rotor wheel is provided with two helicoidal blades. The free space indicated by hatching is designated again with H and the generatrix of the intermediate portion between the chamber 2, 2 enveloping the rotor wheel and the part of the casing in which the guide wheel is arranged is curved to the radii $r_1$, $r_2$, $r_3$. 3 denotes the vertically arranged shaft of the turbine and 5 is the casing of the totally enclosed turbine. The chamber enveloping the rotor wheel is conically shaped and a suction tube joins on to that chamber.

The constructional example shown in Fig. 3 represents a turbine in which the flow of water through the guide apparatus as well as through the rotor wheel takes place in the axial direction. The guide apparatus is provided with fixed vanes 4. The inner portion confining the free space H is of cylindrical shape formed by the protecting tube 6 in which the shaft 3 of the turbine rotates, whereas the outer wall 7 confining the space H has in a meridian section an S-shape. The chamber 2, 2 enveloping the rotor wheel has a variable curvature when seen in a meridian section and a suction tube 8 is joined to that chamber.

Figs. 4 and 5 illustrate the respective dimensions which serve to fulfill the stipulated conditions for the length of the helicoidal blades. The stream line generating the stream line surface on being rotated around the axis of the turbine is shown in Fig. 4, at the distance $r_{1x}$ from the axis at the entrance side of the rotor wheel and at the distance $r_{2x}$ at the exit side of the rotor wheel. Fig. 5 illustrates the developed line of intersection of the blade with the stream line surface, in which the latter has been approximated to be a conical surface. The length $l_x$ is greater than the circumferential pitch in the discharge end of the rotor wheel, the pitch being in this special case equal to $2r_{2x}\ddot{\omega}$.

The axial pitch is variable as indicated at $a^3$ $a^2$ and $a'$, Fig. 5 for three points on the blade.

We claim:

1. In a high specific speed water turbine, a rotor wheel through which the water flows in a substantially axial direction and being rimless at its outer circumference, and having at the utmost three blades, said blades being shaped to form helicoidal surfaces having a variable axial pitch and being of such a length that at any point of a blade the line of intersection of the blade with a stream line surface passing through said point is equal to or greater than the circumferential pitch in this stream line surface at the discharge end of the rotor wheel.

2. In a high specific speed water turbine, a rotor wheel through which the water flows in a substantially axial direction and being rimless at its outer circumference, and having at the utmost three blades, said blades being shaped to form helicoidal surfaces having a variable axial pitch and being of such a length that at any point of a blade the line of intersection of the blade with a stream line surface passing through said point is equal to or greater than the circumferential pitch in this stream line surface at the discharge end of the rotor wheel, and a chamber enveloping the rotor wheel and formed by the rotation of a meridian curve having any continuous shape the main direction of which deviates little from the direction of the axis of the rotor wheel in such a manner that the cross-sectional area of said chamber increases towards the discharge end of the rotor wheel.

3. In a high specific speed water turbine, a rotor wheel through which the water flows in a substantially axial direction and being rimless at its outer circumference, and having at the utmost three blades, said blades being shaped to form helicoidal surfaces having a variable axial pitch and being of such a length that at any point of a blade the line of intersection of the blade with a stream line surface passing through said point is equal to or greater than the circumferential pitch in this stream line surface at the discharge end of the rotor wheel, a chamber enveloping the rotor wheel and formed by the rotation of a meridian curve having any continuous shape the main direction of which deviates little from the direction of the axis of the rotor wheel in such a manner that the cross-sectional area of said chamber increases towards the discharge end of the rotor wheel, and a guide apparatus having a clear width between the walls confining the apparatus which is equal to or greater than the radius of the smallest cross-section of said chamber enveloping the rotor wheel.

4. In a water turbine, a rotor through which the water flows in a substantially axial direction, a blade thereon having a helicoidal driving face; the novelty of which consists in a variable axial pitch for said face and the face having a length such that at any point of the blade face, the line of intersection of the blade face with a stream line surface passing through said point, is equal to or greater than the circumferential pitch in this stream line surface.

5. In a water turbine, a rotor through which the water flows in a substantially axial direction, a blade thereon having a helicoidal driving face; the novelty of which consists in a variable axial pitch for said face and the face having a length such that at any point of the blade face, the line of intersection of the blade face with a stream line surface passing through said point, is equal to or greater than the circumferential pitch in this stream line surface at the discharge end of the rotor.

6. In a water turbine, a rotor through which the water flows in a substantially axial direction, a blade thereon having a helicoidal driving face; the novelty of which consists in a variable axial pitch for said face and the face having a length such that at any point of the blade face, the line of intersection of the blade face with a stream line surface passing through said point, is equal to or greater than the circumferential pitch in this stream line surface at the discharge end of the rotor, and a gate mechanism controlling the admission of water to the rotor.

In testimony that we claim the foregoing as our invention, we have signed our names.

H. F. BELL.
J. SCHNYDER.